Figure 1:
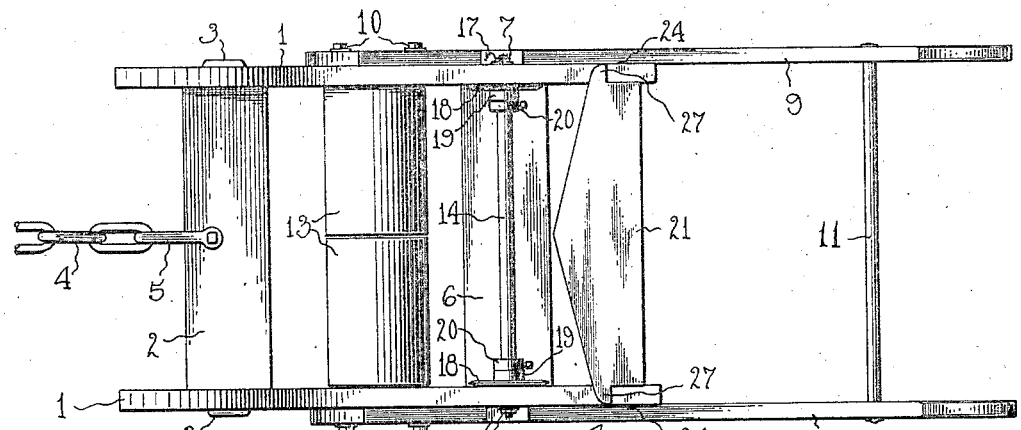
Figure 1:
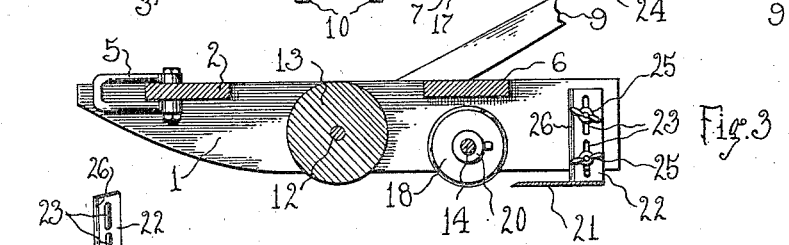
Figure 1:
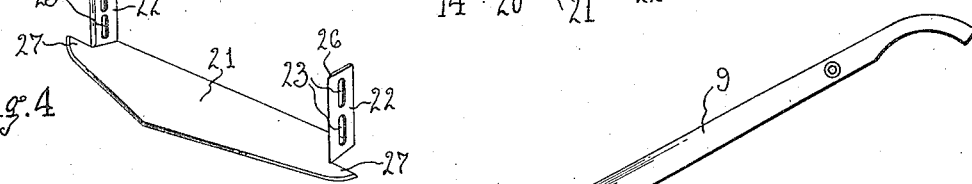

M. C. BEAUPRE.
SOD CUTTER.
APPLICATION FILED JAN. 15, 1916.

1,179,795. Patented Apr. 18, 1916.

Witnesses
Karl H. Butler
Arthur F. Draper

Inventor
Michael C. Beaupre

By
Attorneys

UNITED STATES PATENT OFFICE.

MICHAEL C. BEAUPRE, OF GROSSE POINT FARMS, MICHIGAN.

SOD-CUTTER.

1,179,795.　　　　Specification of Letters Patent.　　Patented Apr. 18, 1916.

Application filed January 15, 1916. Serial No. 72,203.

*To all whom it may concern:*

Be it known that I, MICHAEL C. BEAUPRE, a citizen of the United States of America, residing at Grosse Point Farms, in the county of Wayne and State of Michigan, have invented certain new and useful Improvements in Sod-Cutters, of which the following is a specification, reference being had therein to the accompanying drawings.

This invention relates to a sod cutter for removing strips or ribbons of sod or turf which may be used for sodding a lawn or other purposes.

The primary object of my invention is to provided an animal drawn sod cutting implement having novel coöperating side and bottom adjustable cutters adapted to cut a strip of sod without removing the same from the ground, thus permitting of the strip of sod being rolled and preserved for future use.

A further object of my invention is to provide a simple, durable and inexpensive implement of the above type that can be easily and quickly manipulated in a comparatively small space and adjusted to cut sod and turf of a desired depth.

The above and other objects are attained by a mechanical construction that will be hereinafter described and then claimed, and reference will now be had to the drawing, wherein—

Figure 2:
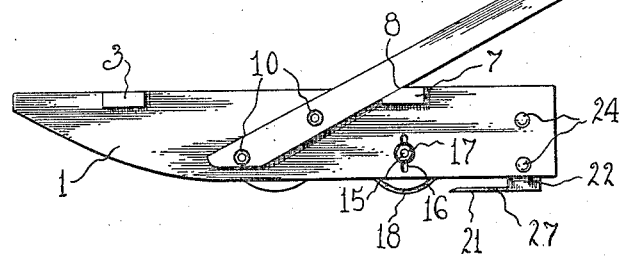

Figure 1 is a bottom plan of an implement in accordance with this invention; Fig. 2 is a side elevation of the same; Fig. 3 is a longitudinal sectional view of a portion of the implement, and Fig. 4 is a perspective view of the detached bottom and side cutter.

The sod cutting implement comprises a set of parallel runners, having the forward ends thereof connected by a platform 2. The platform 2 has ends thereof formed with tongues 3 set in the upper edges of the runners 1 and suitably secured thereto, said platform spacing and bracing the forward ends of the runners and constituting a support for the driver of a draft animal or animals attached to the implement through the medium of a connection 4 and a clevis 5 attached to the platform 2 intermediate the ends thereof. The weight of the driver on the platform 2 retains the implement in engagement with the ground while sod is being cut, and after the driver steps off of the platform preparatory to turning the implement around, the implement can be easily handled minus the weight of the driver.

The runners 1 contiguous to the rear ends thereof, are spaced apart and braced by the transverse member 6 having the ends thereof formed with tongues 7 fitted in and secured to the upper edges of the runners. The tongues 7 protrude from the outer walls of the runners 1 and the protruding ends are beveled, as at 8, to constitute a rest or support for angularly disposed handle bars 9, having the lower ends thereof connected to the outer sides of the runners 1 by screw bolts 10 or other fastening means. The handle bars 9 have the upper ends thereof connected by a tie rod 11 and said handle bars are somewhat similar to plow handles. Considerable importance is attached to the fact that the handle bars 9 rest upon the ends of the member 6, as pressure brought to bear upon the upper ends of the handle bars 9 is transferred to the rear end of the implement to maintain the same in proper relation to the ground for cutting strips of sod.

Connecting the runners 1 in advance of the member 6 is a transverse shaft 12 and rotatable on said shaft are rollers 13 capable of independently revolving, thus facilitating movement of the implement when turning.

Below the member 6 is a transverse adjustment shaft 14 having reduced ends 15 extending through vertically disposed slots 16 in the runners 1. The reduced ends 15 of the shaft are threaded to receive nuts 17 and these nuts engaging the runners 1 hold the shaft 14 in an adjusted position.

Rotatable on the shaft 14, at the inner sides of the runners 1, are circular vertically disposed cutters 18 having hubs 19 providing long bearings on the shaft. The peripheral edges of the rotary cutters 18 are beveled in two directions to form a sharp cutting edge, and to retain the rotary cutters in proximity to the runners 1, collars 20 are secured on said shaft.

At the rear ends of the runners 1 is a horizontally disposed bottom cutter 21 having the ends thereof provided with vertically disposed cutter bars 22 adapted for engagement with the inner sides of the runners 1. The cutter bars 22, are slotted as at 23 to receive the ends of stud bolts 24 mounted in each runner, and the ends of said stud bolts have winged thumb nuts 25 for holding the cutter bars 22 in an adjusted position relative to said runners. The forward edges of the cutter bars 22 are beveled, as at 26 to complete any cutting not accomplished by the rotary cutters 28. The cutter bars 22 follow in the path of the rotary cutters 18 and further assist in separating a strip of sod from the ground.

The bottom cutter 21 has the forward edge thereof tapered and beveled whereby the bottom cutter can easily enter sod with a down draft, and the ends of this cutter have cutting extensions 27 underlying the lower edges of the runners 1. These side extensions coöperate with the bottom cutter in forming a wide kerf, the width of which is greater than the distance between the rotary cutters 18, consequently the bottom of a strip of sod is fully liberated relative to the ground and its removal easily accomplished.

From the foregoing it will be observed that the runners 1, platform 2 and member 6 constitute a frame capable of holding considerable weight and withstanding the rough usage to which it is ordinarily subjected when in use. With the rotary cutters 18 and the bottom cutter 21 adjustable relative to the frame, strips of sod of a desired depth can be easily removed from the ground.

One embodiment of my invention has been illustrated, but it is to be understood that the structural elements are susceptible to such variations and modifications as fall within the scope of the appended claim.

What I claim is:—

A sod cutter comprising runners, a platform connecting the forward ends of said runners, a member connecting said runners and having the ends thereof protruding from the outer sides of said runners, handle bars attached to the outer sides of said runners and resting upon the ends of said member, rotary cutters at the inner sides of said runners below said member, adjustable cutter bars connected to the inner sides of said runners at the rear ends thereof in longitudinal alinement with said rotary cutters, and a bottom cutter connecting said cutter bars and having side extensions below said runners.

In testimony whereof I affix my signature in presence of two witnesses.

MICHAEL C. BEAUPRE.

Witnesses:
 ANNA M. DORR,
 CHAS. W. STAUFFIGER.